(No Model.)

B. F. KING.
PLOW ATTACHMENT.

No. 416,111. Patented Nov. 26, 1889.

Witnesses
Thos Houghton.
Frank B. Marlow.

Inventor
Benjamin F. King,
By Chas. F. Benjamin
Attorney

UNITED STATES PATENT OFFICE.

BENJAMIN F. KING, OF HENRIETTA, TENNESSEE.

PLOW ATTACHMENT.

SPECIFICATION forming part of Letters Patent No. 416,111, dated November 26, 1889.

Application filed June 17, 1889. Serial No. 314,566. (No model.)

*To all whom it may concern:*

Be it known that I, BENJAMIN F. KING, a citizen of the United States, residing at Henrietta, in the county of Cheatham and State of Tennessee, have invented certain new and useful Improvements in Plow Attachments; and I do hereby declare the following to be a full, clear, and exact description of the invention, such as will enable others skilled in the art to which it appertains to make and use the same.

This invention relates to that class of plow attachments generically known as "weed-turners;" and its object is to improve the known methods of turning under weeds, stubble, or sedge during the operation of a plow.

Figure 1:
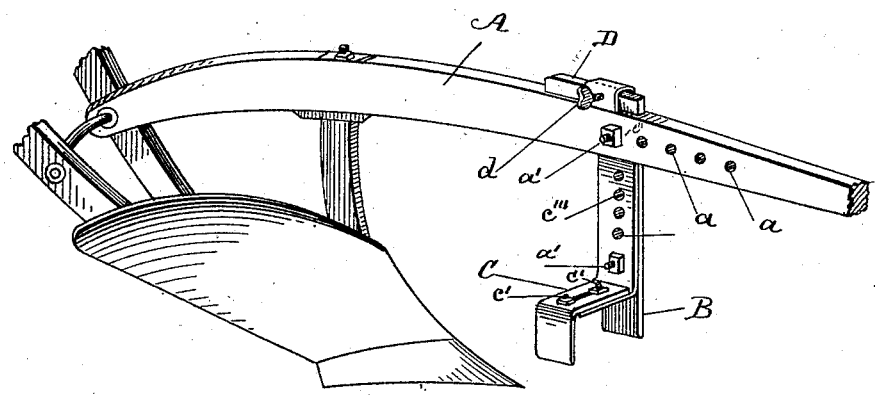
Figure 2:
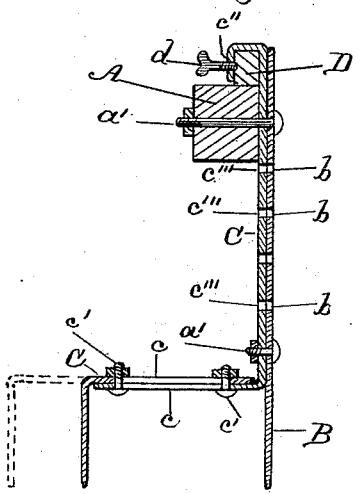

In the accompanying drawings, Figure 1 represents a side perspective of a plow having my attachment; and Fig. 2, a front elevation of the attachment, largely in section.

In both figures like letters represent like parts.

A is the plow-beam.

B is the side gatherer.

C is the weed-turner, consisting of the two pieces shown, which are lapped together and made adjustable by means of eyes $c\ c$ and nut-bolts $c'\ c'$. The upper end of the weed-turner is bent over in the manner shown, forming a socket or passage, into and through which is driven a wedge D, for the purpose of holding the weed-turner in a substantially vertical position when the plow is in operation. By forming an eye $c''$ in the weed-turner and providing the same with a set-screw $d$ the wedge may be prevented from working out of place by the strain of the operation of the plow.

The side gatherer B is perforated with eyes $b\ b$, and similar eyes $c'''\ c'''$ are formed in the weed-turner. Nut-bolts $a'\ a'$ pass through these eyes, clamping together the parts B and C, and by selection among the eyes $b\ b$ the downward length and soil penetration of the side gatherer B may be adjusted at pleasure within the limits of practical necessity. Eyes $a\ a$ are formed along the plow-beam, so that the upper of the bolts $a'\ a'$ may pass through the side of the beam, clamping the parts A, B, and C together.

The construction and operation of weed-turners of this kind or class are so familiar to makers and users of plows that no further description or illustration is deemed necessary. I deem it proper, however, to call attention to the form of the weed-turner C, which is purposely adopted to avoid the tendency of the weeds to gather at the upper part of a curved arm, like that shown, for example, in Hoefelman's patent of August 20, 1872, and so to clog the plow. I further state that my mode of lateral adjustment of the said weed-turner is intended to overcome the objection to those laterally-adjustable arms that are suspended beneath the plow-beam and controlled by a spring, as in Ballard's patent of November 7, 1876, which arms necessarily rise on encountering rank weeds, and so let them escape without burial. My arm C will not gather the weeds to bunch them at or near the top of the arm and so to clog the plow-point and mold-board, nor will it rise to pass over stubborn weeds. I also call attention to the comparative simplicity of my means of lateral and vertical adjustment of the parts B and C and my means of attaching the said parts to the plow-beam, whereby the cost of the weed attachment for making or repairing is materially kept down.

Having thus sufficiently described my invention, what I claim is the following:

The combination of the weed-turner C, bent four times at a right angle and made in two horizontally-adjustable parts, as shown, and having the eyes or slots $c$, the nut-bolts $c'$, and the eyes $c'''$, the side gatherer B, having the eyes $b$, the nut-bolts $a'$, the wedge D, and the ordinary plow-beam A, having the eyes $a$ formed along the length and through the sides thereof, the whole being constructed and arranged as and for the purposes hereinbefore described.

In testimony whereof I affix my signature in presence of two witnesses.

BENJAMIN F. KING.

Witnesses:
W. A. WALTON,
A. B. CROSS.